(12) United States Patent
Nelson et al.

(10) Patent No.: US 7,924,453 B2
(45) Date of Patent: Apr. 12, 2011

(54) PORTABLE MEMORY PRINTING DEVICE AND METHOD

(75) Inventors: David Nelson, Webster, NY (US); Mithila Patwardhan, Rochester, NY (US); David P. Rich, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 1048 days.

(21) Appl. No.: 11/693,051

(22) Filed: Mar. 29, 2007

(65) Prior Publication Data

US 2008/0239364 A1    Oct. 2, 2008

(51) Int. Cl.
*G06F 15/00* (2006.01)
*G06F 3/12* (2006.01)
*G06K 1/00* (2006.01)

(52) U.S. Cl. ...................................... 358/1.15; 358/1.13

(58) Field of Classification Search .................... 358/1.1, 358/1.15, 1.13, 1.16
See application file for complete search history.

(56) References Cited

U.S. PATENT DOCUMENTS

| 2003/0076537 | A1 | 4/2003 | Brown |
| 2008/0126392 | A1* | 5/2008 | Chrisop et al. ................ 707/102 |

* cited by examiner

*Primary Examiner* — Douglas Q Tran

(74) *Attorney, Agent, or Firm* — Gibb I.P. Law Firm, LLC

(57) ABSTRACT

A method comprises collecting printing information relating to an electronic document stored on a computer. The printing information comprises printing attributes according to which the electronic document should be printed. In response to input from a user of the computer, the method causes the electronic document and the printing information to be stored on a portable memory device temporarily connected to the computer. The method causes the electronic document and the printing attributes to be automatically supplied to a printing device after the portable memory device is disconnected from the computer and subsequently connected to the printing device. The method causes the printing device to print the electronic document with the printing attributes based solely on the electronic document and the printing information maintained within the portable memory device.

20 Claims, 3 Drawing Sheets

PORTABLE MEMORY PRINTING DEVICE AND METHOD

BACKGROUND

Embodiments herein generally relate to a portable memory device that can be used to transfer printing information and a document to be printed from a computer to a printer (that is disconnected from the computer) by transferring the document and printing information from the portable memory device directly to the printer when connecting the portable memory device directly to the printer.

As computerized devices become smaller and lighter it becomes more common for such devices to be disconnected from printing devices such as printers, copiers, multifunction machines, etc. Further, with the rapid advances being made in printing technologies, the printing equipment maintained by individuals can sometimes be vastly inferior in printing quality than the printing resources available at commercial print and copy shops.

For example, many users do not personally own color laser printers because of the cost of such devices and associated supplies, and because some users may only need to print in color occasionally. Therefore, it is common for users to prepare documents on their personal computers, copy such documents onto memory devices (such as magnetic or optical discs, portable memory devices such as flash memories, etc.) and then take such portable memory devices to commercial copy shops to print their documents in color (or to print the documents with a higher quality printer). Therefore, there is value in facilitating the ability to transfer documents from a computer to printers that are disconnected or not associated with the computer.

SUMMARY

Embodiments herein include a method of transferring printing information and a document to be printed from a computer to a printer. The method collects printing information relating to an electronic document stored on a computer. The printing information comprises printing attributes according to which the electronic document should be printed, many of which are user designated. Some embodiments can include collecting payment information relating to a user.

In response to input from the user, the method causes the electronic document and the printing information (and optionally the payment information) to be stored on the portable memory device while it is temporarily connected to the computer. After such data is stored on the portable memory device, the portable memory device is disconnected from the computer, transported by the user to the location of the printer, and connected to the printer. When the portable memory device is connected to the printer, the method causes the electronic document and the printing attributes to be automatically supplied to the printing device (e.g., after the portable memory device is disconnected from the computer and subsequently connected to the printing device). The method can also obtain additional input from the user to cause the printing device to begin actually printing the electronic document, or the printing can be automatic and can occur as soon as the portable electronic device is connected to the printer.

Thus, the method causes the printing device to print the electronic document with the printing attributes based solely on the electronic document and the printing information maintained within the portable memory device. After printing, the method can also optionally charge the user an amount for printing the electronic document based on the payment information stored within the portable memory device.

An apparatus embodiment comprises the portable device that has a body and that is adapted to be hand-held and easily transported by the user. An input/output port (wired or wireless) is part of, or connected to the body. The input/output port is adapted to be temporarily operatively connected to (and to communicate with) either the computer or the printing device, depending upon the stage of the printing operation. This apparatus is a separate device distinct from the computer and the printing device. Similarly, the computer is disconnected (and potentially physically separated) from the printing device.

Some form of electronic memory is encased within and connected to the body. A program of instructions is tangibly embodied within the electronic memory (or stored on the computer to which the device is connected) and this program of instructions is adapted to collect the printing information relating to the electronic document stored on the computer and to optionally collect the payment information relating to the user of the computer. Again, the printing information comprises printing attributes according to which the electronic document should be printed.

In response to input from the user of the computer, the program of instructions is adapted to store the electronic document, the printing information, and the payment information within the electronic memory. In a process similar to that described above, the program of instructions is adapted to cause the electronic document and the printing attributes to be automatically supplied to the printing device after the input/output port is disconnected from the computer and subsequently connected to the printing device.

Also, the program of instructions is adapted to cause the printing device to print the electronic document with the printing attributes based solely on the electronic document and the printing information maintained within the electronic memory. If desired, the program of instructions can cause the printing device to obtain additional input from the user to cause the printing device to begin printing the electronic document, or the printing can automatically commence. In a similar manner to that shown above, the program of instructions can be adapted to optionally charge the user an amount for printing the electronic document, again based on the payment information.

The printing attributes comprise instructions relating to a printer driver that is specific to the printing device. The printing attributes can comprise one or more of a printing orientation; a media page size; a printing page range; a number of copies to be printed; a quality of printing; a designation of number of sides for printing; finishing characteristics, etc.

The embodiments herein can also store a printer specification file and print drivers relating to the printing device on the portable memory device prior to connecting the portable memory device to the computer. Each time the portable memory device is connected to a printer, the portable memory device can create or maintain a printer specification and print drivers file relating to that printer. Then, when the user desires to use the same or similar printer, the printer specification file can more accurately determine the printing attributes that are to be saved on to the portable memory device and provide the user with a more accurate representation of how the printer will comply with the user's document specific printing instructions.

Therefore, with the embodiments disclosed herein, the user can connect the portable device to their computer, transfer the document and printing characteristics to the portable device, and then connect the portable device directly to the printer to have the document print. The embodiments herein avoid the need to retrieve the document from the portable memory device using a separate computer connected to the printer, as is required conventionally. The embodiments herein also avoid the need to format the document according to different software and/or printer drivers that may be utilized by the separate computer that is connected to the printer. By avoiding the need to use a computer that is connected to the printer, the process is faster, less cumbersome, and requires less input and action on behalf of the user. Further, the embodiments herein avoid the need to have computers connected to every printing device and instead allow stand-alone printing devices to service users that store the document and printing characteristics on the portable memory devices described herein.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, there is value in facilitating the ability to transfer documents from a computer to printers that are disconnected or not associated with the computer. The embodiments herein provide this ability by storing print job information onto a portable memory storage device to be printed at a later time. Some conventional systems store documents on portable memory storage; however, such documents stored according to conventional methodologies must be opened with compatible software (such as a word processor) before the document can be printed. The present embodiments provide the ability to connect the portable memory device directly to the printer that will print the document, thus bypassing the need to have a computer be connected to the printer that is performing the printing operation. More specifically, such print job information can include job attributes, print images, billing information, security information, and other metadata.

For example, U.S. Patent Publication 2003/0076537 (the complete disclosure of which is incorporated herein by reference) describes a system whereby electronic versions of documents are created and stored on portable memory devices as the documents are being printed to allow a soft copy of each document to be maintained with the hard copy. However, such conventional systems and methodologies do not store printer attributes, printer specifications, etc. with the documents and do not provide any instruction that allows in the printer to act autonomously without the aid of a connected computer when printing the document contained within the portable electronic device. To the contrary, the embodiments described herein provide such printer attributes and print job information as well as the necessary instructions to allow the printer to autonomously print the document by simply having the user connect the portable electronic memory to the printer.

With embodiments herein, stored print jobs can be read and printed directly from the storage device. The printer's capabilities can be stored on the portable memory device, allowing the user to build and store print jobs on the portable memory device with printer-specific attributes without necessarily having the print drivers installed on their local computer.

Also with these embodiments, the user can quickly reuse print jobs stored on the portable memory device and the user can print to multiple printers simultaneously (by copying the stored file to multiple devices). The user can also setup the print job at a computer not connected to (or on the same network as) the printer. Further, with embodiments herein, the user can set print options without needing the actual printer driver and the printer can bill the user automatically. Additionally, with embodiments herein, the printer's user interface is greatly simplified Oust a "Start" button).

Figure 1:
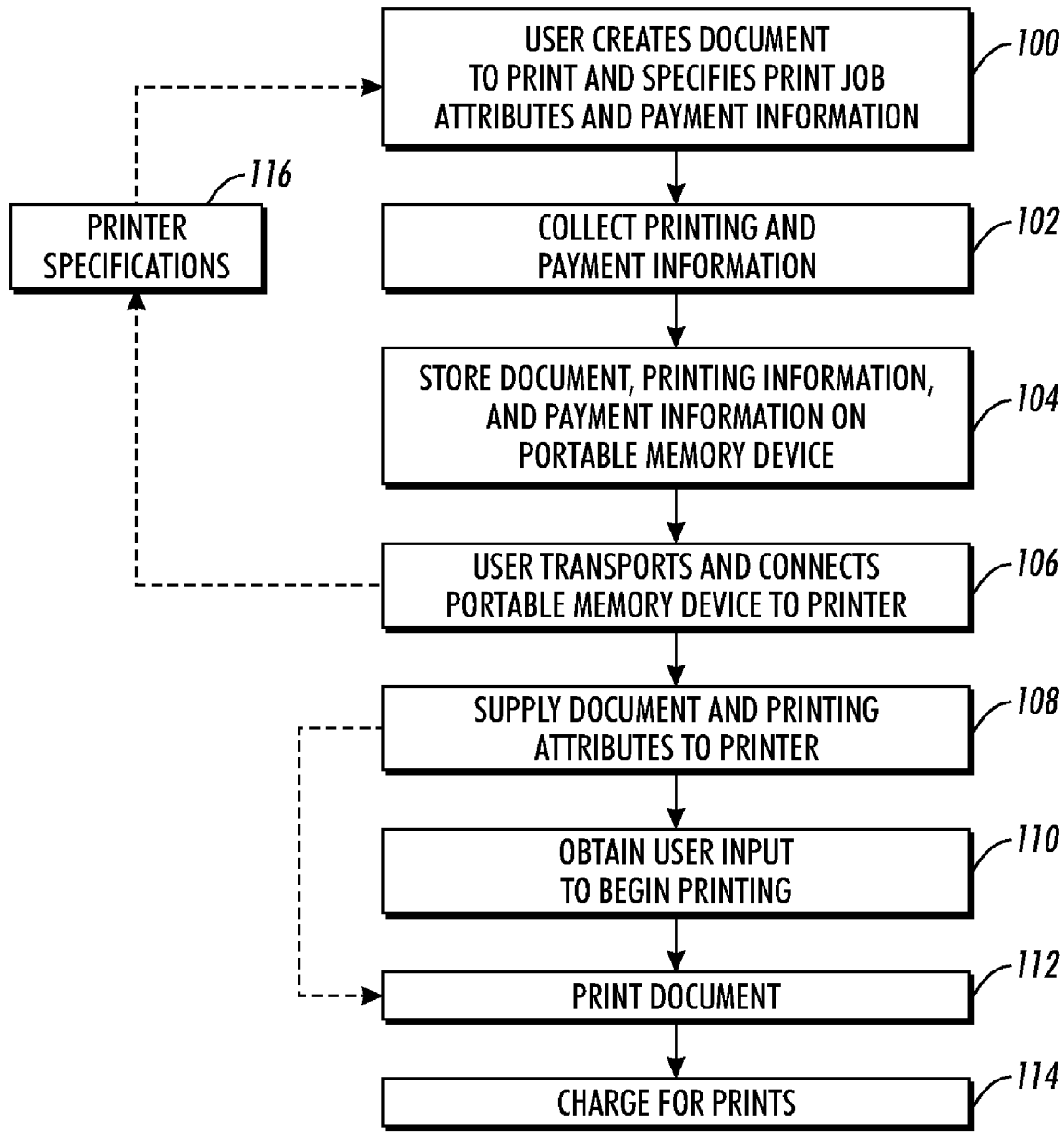
FIG. 1 is a flow diagram illustrating an embodiment herein.

Regarding the details of the embodiments herein, a method of transferring a print job (printing information and a document to be printed) from a computer to a printer is shown in flowchart form in FIG. 1. The creation of the document to be printed (word processing document, image, presentation, spreadsheet, etc.) by the user and the input of the various printing characteristics is shown as item 100.

Item 100 can also include the print job attributes. The printing attributes comprise instructions relating to a printer driver and/or printer specifications that are specific (potentially unique) to the printing device, brand of printing device, class of printing device, etc. The printing attributes can comprise, for example color attributes, printing orientation; a media page size and type; a printing page range; a number of copies to be printed; a quality of printing; a designation of number of sides for printing; finishing characteristics (type of binding, folding, stapling, etc.) as well as many other types of information regarding how the document is to be printed.

Further, item 100 can optionally include the input of user identification and billing information. Such information can include credit card numbers, account numbers, user identifications, department codes, purchase order numbers, quote numbers, customer balance, security attributed, shipping information, or any other information that could be used to track or bill the costs or expense associated with the prints.

In item 102, the method collects printing information relating to the electronic document that is stored on the computer and is ready to be printed. The printing information comprises the foregoing printing attributes (according to which the electronic document should be printed) many of which are user designated. Some embodiments can include collecting the payment information relating to a user, that is also mentioned above.

In response to input from the user (such as a menu selection or other user input) the method causes the electronic document and the printing information (and optionally the payment information) to be stored on the portable memory device while it is temporarily connected to the computer (item 104). After such data is stored on the portable memory device, the portable memory device is disconnected from the computer, transported by the user to the location of the printer, and connected to the printer, as shown in item 106.

When the portable memory device is connected to the printer, the method causes the electronic document and the printing attributes to be automatically supplied to the printing device as shown in item 108 (e.g., after the portable memory device is disconnected from the computer and subsequently connected to the printing device). The method can also obtain additional input from the user (item 110) to cause the printing device to begin actually printing the electronic document (item 112). The input mentioned in item 110 can be as simple as selecting the "Start" button on the printing device, or can be a more complex interaction using the graphic user interface of the printer to select which items on the portable electronic device are to be printed, how many copies, etc. Alternatively, the printing (item 112) can be automatic and can occur as soon as the portable electronic device is connected to the printer, without requiring any user input.

Thus, the method causes the printing device to print the electronic document with the printing attributes based solely on the electronic document and the printing information maintained within the portable memory device (e.g., the user is not required to interact with software running on a computer to open the document stored on the portable memory device or to direct the document to a printer connected to the computer). After printing, the method can also optionally charge the user an amount (monetary amounts, credits, etc.) for printing the electronic document based on the payment information stored within the portable memory device through the billing software maintained in the printer, as shown in item 114.

As mentioned above, the software within the portable memory device can also transfers a copy of the printer's capability specification and print drivers to the portable memory device so that the user can set printer-specific options the next time the user builds a job intended for this printer. Thus, item 116 illustrates that, after the portable memory device is connected to the printer in item 106, the portable memory device can store a printer specification file relating to the printing device on the portable memory device prior to connecting the portable memory device back to the computer. Each time the portable memory device is connected to a printer, the portable memory device can create or maintain (update) a printer specification file relating to that printer in item 116. Alternatively, the software in the portable memory device can download printer specification and print drivers from a network (e.g., the internet) while the computer is connected to such a network. Also the portable memory device can come preloaded with common or universal print drivers and specifications. Then, when the user desires to use the same or similar printer, the printer specification file can more accurately determine the printing attributes that are to be saved on to the portable memory device and provide the user with a more accurate representation of how the printer will comply with the user's document specific printing instructions.

Figure 2:
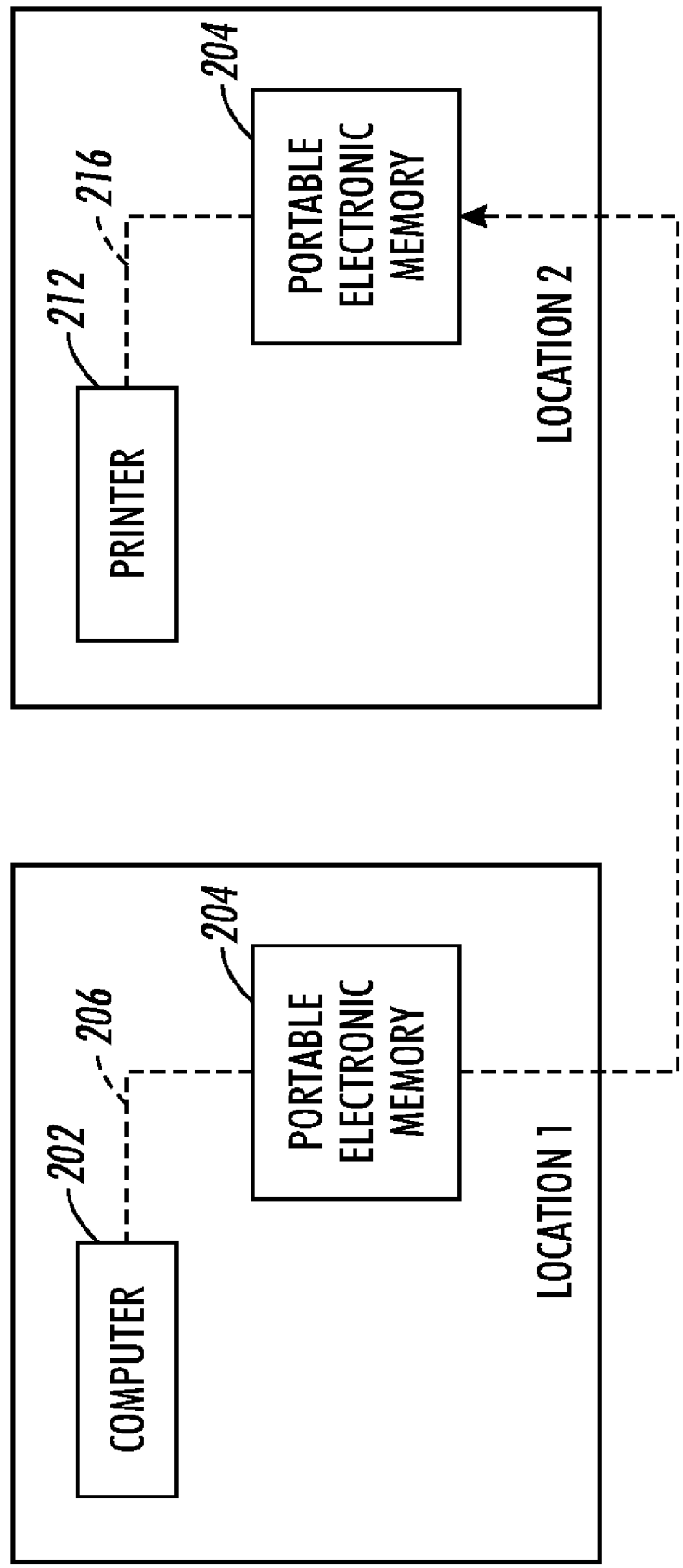
FIG. 2 is a schematic representation of a system according to embodiments herein.

A simplified example of how embodiments herein operate is provided in FIG. 2. This example uses a universal serial bus (USB) flash drive as a portable memory device 204. In this example, the user wishes to print a presentation. Thus, the user prepares the presentation at Location 1 and then enters job information via a custom print dialog on his home personal computer (PC) 202. The user specifies the paper size and type, the color attributes, the type of binding the user wants, and his credit card billing information. The user connects the portable memory device 204 to the computer 202 by some form of wired or wireless connection 206. The print dialog on the computer 202 stores the presentation and job attributes in a printer-agnostic format as a file on the user's USB flash drive 204, as controlled by the software within the USB flash drive.

Computers are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein.

The user travels to his favorite document services provider (Location 2). The computer 202 at Location 1 is not connected (either directly or operatively) to the printer 212 at Location 2. Thus, the portable memory device 204 is a separate device distinct from the computer 202 and the printing device 212. Similarly, the computer 202 is disconnected and potentially physically separated from the printing device 212.

The words printer, printing device, etc. as used herein encompasses any apparatus, such as a digital copier, bookmaking machine, facsimile machine, multi-function machine, etc. which performs a print outputting function for any purpose. The details of printers, printing engines, etc., are well-known by those ordinarily skilled in the art. Printers are readily available devices produced by manufactures such as Xerox Corporation, Stamford, Conn., USA and Hewlett Packard Company, Palo Alto Calif., USA. Such printers commonly include input/output, power supplies, processors, media movement devices, marking devices, billing software, etc., the details of which are omitted herefrom to allow the reader to focus on the salient aspects of the embodiments described herein. All foregoing embodiments are specifically applicable to electrostatographic and/or xerographic machines and/or processes.

The user connects his USB flash drive 204 to the printers 212 by way of a wired or wireless connection 216. Following instructions within the USB flash drive 204, the printer 212 searches the user's USB flash drive 204 for job information, and displays the stored jobs on the printer's graphic user interface. The software within the USB drive 204 also transfers a copy of the printer's capability specification and print drivers to the USB flash drive 204 so that the user can set printer-specific options the next time the user builds a job intended for this printer. When the user presses the "Start" button on the printer 204, the printer 204 translates any printer-agnostic information into the appropriate device settings and prints the print job. The printer 204 bills (or causes the document services provider to bill) the user for the prints made.

Figure 3:
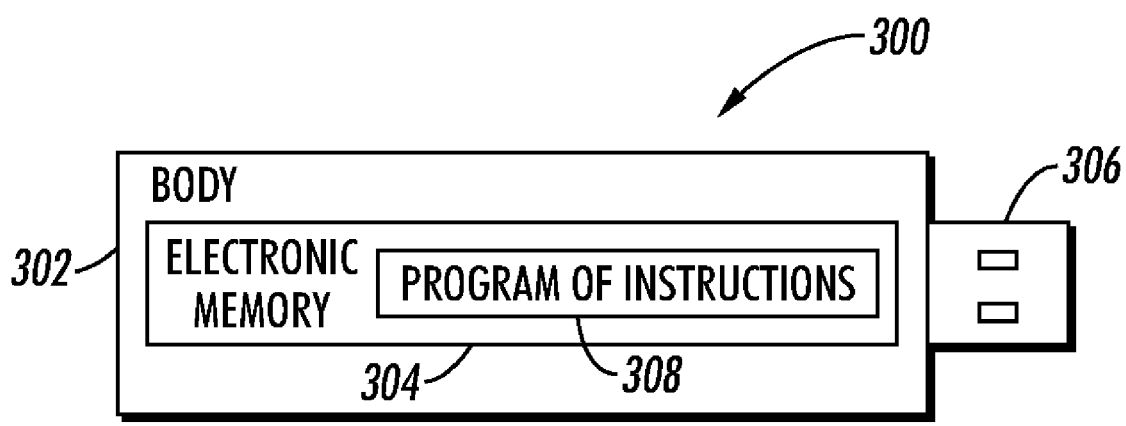
FIG. 3 is a schematic representation of a portable memory device according to embodiments herein.

One exemplary apparatus embodiment that is shown in FIG. 3 comprises the portable device that has a body 302 and that is adapted to be hand-held and easily transported by the user. Portable memory storage devices could include, but are not limited to, USB Flash drives, secure digital (SD) memory cards and similar, personal digital assistants (PDAs), mobile phones, proprietary cartridges, and magnetic or optical media. There are many types of portable memory devices currently available and the details of such devices are not discussed in detail. For example, many different types of such portable memory devices are available from many suppliers, including Belkin International, Inc., Los Angeles, Calif., USA; 3M Corporation, St. Paul, Minn., USA; and SanDisk Corporation, Milpitas, Calif., USA.

An input/output port 306 (wired or wireless) is part of, or is connected to the body 302. The input/output port 306 is adapted to be temporarily operatively connected to (and to communicate with) either the computer 202 or the printing device 212, depending upon the stage of the printing operation. The input/output port 306 can comprise one or more (different or similar) electrical contacts designed to physically connect to corresponding physical connections on the printer and computer. Alternatively, the input/output port 306 shown in FIG. 3 can comprise one or more (similar or different) wireless antennas that can communicate with similar antennas on the printer and/or computer. As appropriate, the communication ports between the printer and the storage device can include, but is not limited to, USB, IEEE1394, Bluetooth, IrDA, radio frequency (RF), compact disk (CD)/disk/tape drive, or direct bus connection.

Any form of electronic memory 304 is encased within and connected to the body 302. A program of instructions is tangibly embodied within the electronic memory 304 (or stored on the computer 202) and this program of instructions 308 is adapted to collect the printing information relating to the electronic document stored on the computer and to optionally collect the payment information relating to the user of the computer. Again, the printing information comprises printing attributes according to which the electronic document should be printed.

In response to input from the user of the computer, the program of instructions 308 is adapted to store the electronic document, the printing information, and the payment information within the electronic memory. In a process similar to that described above, the program of instructions 308 is adapted to cause the electronic document and the printing attributes to be automatically supplied to the printing device when the input/output port is disconnected from the computer and subsequently connected to the printing device.

Also, the program of instructions 308 is adapted to cause the printing device to print the electronic document with the printing attributes based solely on the electronic document and the printing information maintained within the electronic memory. If desired, the program of instructions 308 can cause the printing device to obtain additional input from the user to cause the printing device to begin printing the electronic document, or the printing can automatically commence. In a similar manner to that shown above, the program of instructions 308 can be adapted to optionally charge the user an amount for printing the electronic document, again based on the payment information.

The printing attributes comprise instructions relating to a printer driver that is specific to the printing device. The printing attributes can comprise one or more of a printing orientation; a media page size; a printing page range; a number of copies to be printed; a quality of printing; a designation of number of sides for printing; finishing characteristics, etc.

Therefore, with the embodiments disclosed herein, the user can connect the portable device to their computer, transfer the document and printing characteristics to the portable device, and then connect the portable device directly to the printer to have the document print. The embodiments herein avoid the need to retrieve the document from the portable memory device using a separate computer connected to the printer, as is required conventionally. The embodiments herein also avoid the need to format the document according to different software and/or printer drivers that may be utilized by the separate computer that is connected to the printer. By avoiding the need to use a computer that is connected to the printer, the process is faster, less cumbersome, and requires less input and action on behalf of the user. Further, the embodiments herein avoid the need to have computers connected to every printing device and instead allow stand-alone printing devices to service users that store the document and printing characteristics on the portable memory devices described herein.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   collecting printing information relating to an electronic document stored on a computer, wherein said printing information comprises printing attributes according to which said electronic document should be printed;
   in response to input from a user of said computer, causing said electronic document and said printing information to be stored on a portable memory device temporarily connected to said computer;
   causing said electronic document and said printing attributes to be automatically supplied to a printing device after said portable memory device is disconnected from said computer and subsequently connected to said printing device; and
   causing said printing device to print said electronic document with said printing attributes based solely on said electronic document and said printing information maintained within said portable memory device.

2. The method according to claim 1, wherein said printing attributes comprise instructions relating to a printer driver that is specific to said printing device.

3. The method according to claim 1, further comprising causing said printing device to obtain additional input from said user to cause said printing device to begin printing said electronic document.

4. The method according to claim 1, further comprising storing a printer specification file relating to said printing device on said portable memory device prior to connecting said portable memory device to said computer.

5. The method according to claim 1, wherein said printing attributes comprise at least one of: a printing orientation; a media page size; a printing page range; a number of copies to be printed; a quality of printing; a designation of number of sides for printing; and finishing characteristics.

6. A method comprising:
   collecting printing information relating to an electronic document stored on a computer, wherein said printing information comprises printing attributes according to which said electronic document should be printed;
   collecting payment information relating to a user;
   in response to input from said user, causing said electronic document, said printing information, and said payment information to be stored on a portable memory device temporarily connected to said computer;
   causing said electronic document and said printing attributes to be automatically supplied to a printing device after said portable memory device is disconnected from said computer and subsequently connected to said printing device;
   causing said printing device to print said electronic document with said printing attributes based solely on said electronic document and said printing information maintained within said portable memory device; and
   charging said user an amount for printing said electronic document based on said payment information.

7. The method according to claim 6, wherein said printing attributes comprise instructions relating to a printer driver that is specific to said printing device.

8. The method according to claim 6, further comprising causing said printing device to obtain additional input from said user to cause said printing device to begin printing said electronic document.

9. The method according to claim 6, further comprising storing a printer specification file relating to said printing device on said portable memory device prior to connecting said portable memory device to said computer.

10. The method according to claim 6, wherein said printing attributes comprise at least one of: a printing orientation; a media page size; a printing page range; a number of copies to be printed; a quality of printing; a designation of number of sides for printing; and finishing characteristics.

11. An apparatus comprising:
a body adapted to be hand-held and transported by a user;
an input/output port connected to said body, wherein said input/output port is adapted to be temporarily operatively connected to, and to communicate with a computer and a printing device, and wherein said apparatus comprises a separate device distinct from said computer and said printing device, and wherein said computer is disconnected from said printing device;
an electronic memory connected to said body; and
a program of instructions tangibly embodied within said electronic memory,
wherein said program of instructions is adapted to collect printing information relating to an electronic document stored on said computer,
wherein said printing information comprises printing attributes according to which said electronic document should be printed,
wherein in response to input from said user, said program of instructions is adapted to store said electronic document and said printing information within said electronic memory,
wherein said program of instructions is adapted to cause said electronic document and said printing attributes to be automatically supplied to said printing device after said input/output port is disconnected from said computer and subsequently connected to said printing device, and
wherein said program of instructions is adapted to cause said printing device to print said electronic document with said printing attributes based solely on said electronic document and said printing information maintained within said electronic memory.

12. The apparatus according to claim 11, wherein said printing attributes comprise instructions relating to a printer driver that is specific to said printing device.

13. The apparatus according to claim 11, wherein said program of instructions is adapted to cause said printing device to obtain additional input from said user to cause said printing device to begin printing said electronic document.

14. The apparatus according to claim 11, wherein after said input/output port is connected to said printing device, said program of instructions is adapted to store a printer specification file relating to said printing device on said portable memory device.

15. The apparatus according to claim 11, wherein said printing attributes comprise at least one of: a printing orientation; a media page size; a printing page range; a number of copies to be printed; a quality of printing; a designation of number of sides for printing; and
finishing characteristics.

16. An apparatus comprising:
a body adapted to be hand-held and transported by a user;
an input/output port connected to said body, wherein said input/output port is adapted to be temporarily operatively connected to, and to communicate with a computer and a printing device, and wherein said apparatus comprises a separate device distinct from said computer and said printing device, and wherein said computer is disconnected from said printing device;
an electronic memory connected to said body; and
a program of instructions tangibly embodied within said electronic memory,
wherein said program of instructions is adapted to collect printing information relating to an electronic document stored on said computer and to collect payment information relating to said user;
wherein said printing information comprises printing attributes according to which said electronic document should be printed,
wherein in response to input from said user, said program of instructions is adapted to store said electronic document, said printing information, and said payment information within said electronic memory,
wherein said program of instructions is adapted to cause said electronic document and said printing attributes to be automatically supplied to said printing device after said input/output port is disconnected from said computer and subsequently connected to said printing device,
wherein said program of instructions is adapted to cause said printing device to print said electronic document with said printing attributes based solely on said electronic document and said printing information maintained within said electronic memory, and
wherein said program of instructions is adapted to charge said user an amount for printing said electronic document based on said payment information.

17. The apparatus according to claim 16, wherein said printing attributes comprise instructions relating to a printer driver that is specific to said printing device.

18. The apparatus according to claim 16, wherein said program of instructions is adapted to cause said printing device to obtain additional input from said user to cause said printing device to begin printing said electronic document.

19. The apparatus according to claim 16, wherein after said input/output port is connected to said printing device, said program of instructions is adapted to store a printer specification file relating to said printing device on said portable memory device.

20. A computer program product comprising:
a computer readable storage medium storing instructions that, when executed by a computer, cause said computer to perform a method comprising:
collecting printing information relating to an electronic document stored on a computer, wherein said printing information comprises printing attributes according to which said electronic document should be printed;
in response to input from a user, causing said electronic document and said printing information to be stored on a portable memory device temporarily connected to said computer;
causing said electronic document and said printing attributes to be automatically supplied to a printing device after said portable memory device is disconnected from said computer and subsequently connected to said printing device; and
causing said printing device to print said electronic document with said printing attributes based solely on said electronic document and said printing information maintained within said portable memory device.

* * * * *